United States Patent

[11] 3,619,635

| [72] | Inventors | Francis T. Thompson<br>Murrysville;<br>Andre Wavre, Monroeville, both of Pa. |
|---|---|---|
| [21] | Appl. No. | 798,912 |
| [22] | Filed | Feb. 13, 1969 |
| [45] | Patented | Nov. 9, 1971 |
| [73] | Assignee | Westinghouse Electric Corporation<br>Pittsburgh, Pa. |

[54] POWER REGULATION SYSTEM
22 Claims, 16 Drawing Figs.

| [52] | U.S. Cl. | 307/11 |
|---|---|---|
| [51] | Int. Cl. | H02j 1/00 |
| [50] | Field of Search | 307/38, 39, 40, 41, 31, 11, 32, 35; 328/75, 106; 317/139; 329/104; 340/248; 310/14 |

[56] References Cited
UNITED STATES PATENTS

| 3,153,728 | 10/1964 | Procter | 307/31 |
|---|---|---|---|
| 3,337,741 | 8/1967 | Mislan | 307/41 |

Primary Examiner—Robert K. Schaefer
Assistant Examiner—H. J. Hohauser
Attorneys—A. T. Stratton, Z. L. Dermer and J. W. Wigert, Jr.

ABSTRACT: A system is disclosed for providing a desired energizing current, according to a reference current signal, to a load or group of load elements. Three-phase energizing current is rectified by a plurality of controlled switching devices such as thyristors, and means are provided for varying the firing angle of the thyristors in accordance with the reference current signal to regulate the resulting output voltage therefrom and thereby regulate the energizing current through the load. Digital transmission means are provided to transmit digital signals in a high noise level environment. A plurality of error detecting circuits provide alarm signals in the event that the desired current is exceeded, maximum current is called for, or one of the power phases is missing, for more than predetermined time periods. Improved means are also provided for synchronizing asynchronous generators to provide a single three-phase power source.

POWER REGULATION SYSTEM

CROSS-REFERENCES TO RELATED APPLICATIONS

The present invention is related to the invention covered by copending Pat. application (Westinghouse Case No. 40,534), Ser. No. 798,911, filing date Feb. 13, 1969, entitled "Power Multiplexing System" by Andre Wavre, copending Pat. application (Westinghouse Case No. 40,536), Ser. No. 798,913, filing date Feb. 13, 1969, entitled "Pulse Sequencing System," by Andre Wavre; and copending Pat. application (Westinghouse Case No. 40,741), Ser. No. 798,914, filing date Feb. 13, 1969, entitled "Signal Sequencing Systems," by Andre Wavre and Dean Santis; all of which are assigned to the assignee of the present invention and filed concurrently herewith.

The present invention is also related to the invention covered by copending Pat. application Ser. No. 695,684, filed Jan. 4, 1968, entitled "Automatic Generator Synchronizing and Connecting System and Synchronizer Apparatus for Use Therein" by John H. Bednarek, et al.

BACKGROUND OF THE INVENTION

The present invention relates to an improved solid state system for providing direct current to a single or plurality of load elements from a three-phase power supply system according to a predetermined current level sequence, and also includes the provision of a number of protective alarm circuits for insuring proper current flow through the load elements.

There are a great number of applications for applying direct current through a load or a plurality of load elements according to a predetermined current level sequence. For example, in the nuclear art it is necessary to raise and lower control rods within the reactor core for controlling the amount of energy output from the nuclear reactor. The use of the term "control rods" is used here to include any member positioned within the reactor which alters the reactivity of the reactor. Thus, this includes rods which serve other purposes besides normal control use. The use of the word "rod" is synonymous with "control rod" for the purposes of this invention. The control rods are located in proximity with nuclear fuel elements consisting of nuclear fissionable fuel. Generally, the greater number of neutrons in the reactive region, the greater the number of fissions of the fuel atoms take place, and consequently the greater the amount of energy is released. Energy, in the form of heat, is removed from the reactive region by a coolant which flows through the region and then flows to a heat exchanger wherein the heat from the reactor coolant is used for generating steam for driving turbines to transform heat energy into electrical energy. To decrease the energy output of the nuclear reactor, the control rods, made of material which absorbs neutrons, are inserted within the reactive region. The greater the number of control rods and the farther the control rods are inserted within the reactive region, the greater number of neutrons will be absorbed and hence the energy output of the reactor will be decreased. Conversely, to increase the energy output of the nuclear reactor, the nuclear control rods are withdrawn from the reactive region; consequently the number of neutrons absorbed decreases, the number of fissions increases, and the energy output of the reactor increases. Control rods typically are arranged in banks, with each bank comprising a number of groups of control rods. Because of safety considerations, extremely reliable control rod systems must be used.

One system presently used to lower and raise the control rods has incorporated a jack-type electromechanical mechanism which employs a plurality of electrical coils to incrementally insert or withdraw each control rod within the reactor. These incremental steps are repeated usually by groups within a bank or banks, as many times as necessary in order to move the control rods to a position which produces the desired output from the reactor.

One such jack mechanism is more fully described in U.S. Pat. No. 3,158,766 issued to E. Frisch and assigned to the assignee of the present invention. The jack mechanism disclosed in the Frisch patent includes three inductive coils, one for gripping, one for lifting and one for holding the control rod in a stationary position. Thus when there are a given plurality of control rods within the reactor, there will be a corresponding number of gripper, lift, and stationary holding coils operative with those control rods. It is desirable, and in fact mandatory, that the rods be lifted in a predetermined order so that no one rod is above or below any of the others in its group. The current requirements for each of the coils within a group will be the same at all times for all of the corresponding coils i.e., in all of the lift, gripper and the stationary coils.

One method for supplying current to each of these types of coil or load elements employs electromechanical means. Such a system is shown, for example in U.S. Pat. No. 3,099,778, issued to W. R. Kennedy et al. and assigned to the assignee of the present invention. In that patent, electromechanical contacts are sequentially opened and closed by a motor driven cam contact arrangement to provide full voltage to the coils for the entire period that they were energized.

There are many disadvantages of this type of electromechanical current for sequencing such a plurality of load elements. First, no current regulation is provided by such a scheme. The contactors merely close and open the circuit thereby directing all or none of the current from the power source through each of the groups of load elements or coils, and therefore no current regulation is provided. The current conducted by the coil depends on the inductance and resistance of the coil. Cold coils conduct considerably more current. In the case of a nuclear reactor, current levels have been increased substantially in control rod systems, particularly in control rod jack mechanisms in order to achieve faster rod movement. In a nuclear control rod jack mechanism the steady state current for one jack lift coil is approximately 90 amps at 125 volts under cold conditions and 51 amps at 125 volts under hot conditions. Secondly, the energy stored in the inductive coils must be dissipated when the contactor is opened, and thus most energy is wasted. Because of the high energy stored in the coils, damage to the electromechanical contacts due to arcing and insulation breakdown due to voltage transients is common and the possibility of equipment failure exists. The higher power dissipation in the coils as a result of the current level increase has made current regulation highly desirable or even necessary. Lowering the dissipation in the coils increases insulation life and decreases supply requirements. Third, it is often desired to energize and deenergize each group of inductive load elements very rapidly and the resulting operating rate and power dissipation can be beyond the capability of electromechanical switching components presently used. Finally, in the past art devices, no provision has been made to check to see that the current called for through each of the load elements, or, as in the case of the nuclear control rod system, the current through each group of jack mechanism coils, has in fact gone through these loads, or has exceeded the time period during which such currents are required. As a result, it has been possible to burn out the load elements necessitating expensive and often burdensome repairs, particularly in a nuclear reactor where such repairs result in an expensive shutdown of the whole nuclear plant.

SUMMARY OF THE INVENTION

In accordance with the present invention a novel half-wave solid state rectifying bridge is provided for applying multilevel direct current from a three-phase source to a single or plurality of load elements. The direct current is provided according to a predetermined, cyclical signal reference current to regulate and minimize the amount of energy used by the load elements. Further, where several elements or groups of load elements have differing current requirements, it is herein provided according to the present invention, that the proper current flow through each element or groups of load elements.

The direct current is provided by the use of controlled silicon-controlled rectifiers, switching devices, or more particularly, thyristors, each of which is connected with one output from a three-phase power system to provide direct current therefrom. The value of the direct current from the outputs of these thyristors is determined according to the time at which each thyristor is fired. For example, if the thyristors are sequentially fired, i.e. put into the conducting state and thereby act as a closed switch, at predetermined points, described in detail subsequently, near the maximum positive point of each of the three phases of the three-power source, the resulting direct current output will have a high value average. At the other extreme, if the thyristors are fired at predetermined points, described in detail subsequently, shortly after the maximum negative point of each of the power phases, negative forcing will occur which causes energy stored in the load element or elements to be returned to the power supply system. Between these two extremes, i.e., between maximum positive and maximum negative forcing, there exists a range in which the forcing and the resulting current may be supplied according to the load element current requirements. It should be noted that by returning this energy to the power supply, it is possible to avoid damaging current transients, therefore eliminating the need for bulky, expensive transient suppression means. Furthermore, since the amount of current can be controlled by altering the firing angle of the thyristors, unlike the presently used systems, wherein maximum or zero current only may be supplied to the load, only the necessary amount of current is provided during those periods of load operation where full current is not required.

Hence, it can be seen that energy is conserved both because it is returned to the system through negative forcing and because the amount of the current supplied to the load may be regulated. Furthermore, since electromechanical contacts are replaced by solid state components, the reliability of the present invention is enhanced considerably.

The correct firing angle is determined by a novel auctioneering current regulator. The auctioneering current regulator compares the largest current running through any of the load elements with the current value called for by a reference current source and then instructs thyristor firing circuits to fire the thyristor at such a phase angle so as to bring the direct current through the load elements to the value called for by the reference current source.

The reference current source comprises a logic system or slave cycler which provides a cyclical sequence of digital signals according to the predetermined desired current value required by the load. These binary signals are transmitted through a novel binary transmission system to a current reference generator which provides a corresponding analog signal to the auctioneering regulator according to the required current. The novel communication system includes transformer coupling that eliminates the problem of reference levels in a system having high noise levels due to the large currents in the power supply system. The transformer and a resistor form a current source that is opened or shorted by a digital input signal provided on the secondary side of the transformer. The information is read on the primary side of the transformer by a level detector. To send information out from the power supply a second transformer is utilized. A second solid state switch is provided in series with another resistor. As the second solid state switch is opened and closed, a level detector reads the signal on the secondary side of the transformer.

As pointed out earlier, it is desirable to provide a means of detecting faulty conditions in the current supply system wherein it is then possible to take the necessary action to repair the fault before the failure of the load elements to function properly results in failure of the system. For example, in a nuclear reactor, such protective systems could prevent dropped rods or expensive shutdowns to make repairs in the reactor containment area which is difficult to work in. It is further desirable to provide indication of the location of the fault so that the system operator is able to locate the faulty element readily. This is particularly important since solid state equipment is used in the present invention, since it is often more difficult to locate faults in solid state apparatus than in previously used electromechanical apparatus. Consequently, alarm systems that detect failure and give their locations is highly desirable.

Generally, the invention includes the use of a plurality of error detectors located at strategic points within the system. Error detectors are gated to provide a single error alarm signal which is sent to a control room to energize an alarm to warn the operator of a fault in the system. Additionally, the signal from the gate is sent to a light located within the cabinet holding the power supply for that particular group of load elements. Further, the signal is also sent from the gate to the current reference generator which will immediately reduce the current in load elements wherein possible damage might be caused due to an excessive amount of current flowing therein.

More particularly, and referring again to the specific embodiment of the present invention in a nuclear reactor rod control system, the logic circuitry associated with the reference current generator would, upon a signal from one of the error detectors, act immediately to command reduced current in the stationary and movable coils, and also to command zero current through the lift coils. This is done because, at the time of the fault, it is impossible to know at what point in the sequencing operation of the jack mechanism the fault has occurred. By supplying reduced current to both of the movable and stationary hold coils it is insured that the gripper which is currently engaged will remain engaged, to prevent dropping rods. However, it may not be possible in all cases to prevent dropping of the control rods. In this case, both the stationary and movable gripper coils, because they are fed with reduced current only, do not hold the control rods too tightly and hence the control rods will drop without causing damage to the jack mechanisms.

Three improved protection alarm circuits reduce the possible damage resulting from a system failure. The first protection circuit checks to ascertain whether maximum current has been asked for by the reference current source for a period of time longer than a predetermined safe period of time. The signal provided by the current reference generator is analyzed to determine whether or not the current reference signal requires maximum voltage forcing, for a period of time longer than that required for normal sequencing. Maximum voltage forcing might be called for, for example, for a prolonged period of time as a result of malfunction in the logic circuitry, or from faulty connections.

Without this alarm protection circuit, the load elements might continue to take full current until they burn out. During this time, it would otherwise be impossible to know that the load elements are overloaded and it would not be known until their failure that such an overload has occurred. In an environment such as the inductive coils in a rod control jack mechanism in a nuclear reactor, this would mean that the entire nuclear reactor would have to be shutdown so that the jack mechanism could be replaced. This would be very time consuming and very expensive.

A regulation error detection circuit checks the actual current going through each of the load elements. In many situations it is very important that the current through each of the load elements corresponds to the value that is called for. For example, this is very important in a nuclear rod control system where, as a result of improper current through the jack mechanism coils, the rods could drop into the reactor or the rod sequencing could be disturbed. The former possibility would cause the reactor to shutdown and the latter possibility cannot be tolerated because of uneven neutron flux which would develop therefrom. Furthermore, sequencing rods improperly results in additional wear on the jack mechanisms.

A third protection circuit is provided to provide an alarm signal when one or more of the phases from the three-phase power supply is no longer provided, such as, for example, whenever one of the thyristors shorts or acts like a diode, or when a phase fuse is blown. Briefly, the missing phase detector comprises circuitry for comparing the ripple normally present in the direct voltage output from the thyristor rectifying bridge, which is relatively small during maximum positive and negative forcing when all three phases are being utilized, with the ripple when one of the phases is missing or when one of the thyristors is faulty, at which time the ripple is very large.

DESCRIPTION OF THE INVENTION

Figure 1:
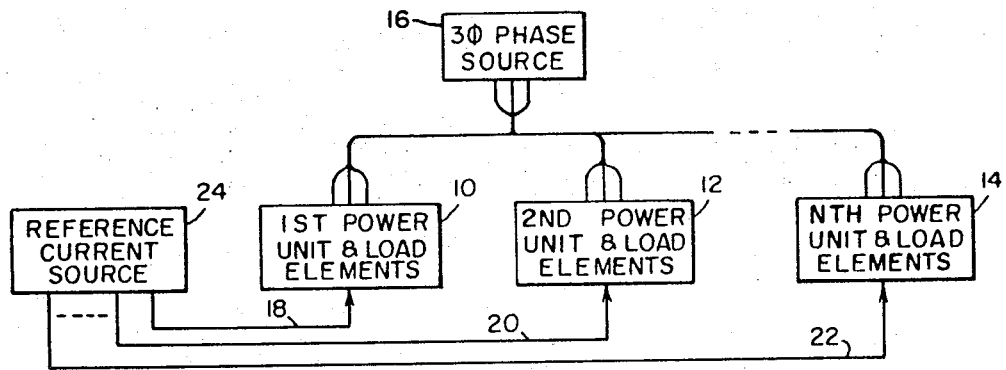
FIG. 1 is a block diagram of an improved power and regulation system.

In FIG. 1, first, second and Nth power units 10, 12 and 14 convert three-phase current from power source 16 so that it may be utilized by a plurality of load elements located therein. The current through each group of load elements has a value in accordance with predetermined sequential current signals 18, 20 and 22 provided by reference current source 24.

An example of where such an arrangement is desirous is in a nuclear reactor. To insert and withdraw control rods in a nuclear reactor it is necessary to sequentially energize three coils comprising each jack mechanism. To hold a rod the stationary coil is energized at reduced current causing the stationary gripper to hold the control rod. The sequence is as follows: First, a movable coil is energized, thereby causing a second, or movable gripper to hold the control rod. The movable gripper is located on a longitudinally movable member which may be raised or lowered according to the energization of a third coil, the lift coil, then the stationary coil is deenergized and the stationary gripper releases the rods. Next the lift coil is energized causing the longitudinal member, the gripper, and hence the control rod to move upward one incremental step. The stationary gripper coil is deenergized prior to energization of the lift coil. Once the control rod is moved the proper incremental distance the stationary coil is energized, then the movable gripper is deenergized, finally the lift coil is deenergized and the stationary coil current is reduced for holding the rod.

In present rod control systems, only a unilevel current flows through each of the jack mechanism coils because of the electromechanical nature of the same. However, it is desirable to be able to decrease the current through the coils if and when less current is needed to perform required functions. For example, when the lift coil is energized, a relatively large amount of current is required to lift the control rod because of the initial inertia presented by the control rod. However, once the rod has moved less current is required to maintain it at its new, raised position. Thus, it would be desirable to provide a system wherein the exact amount of current required at any given time is provided.

Figure 2A:
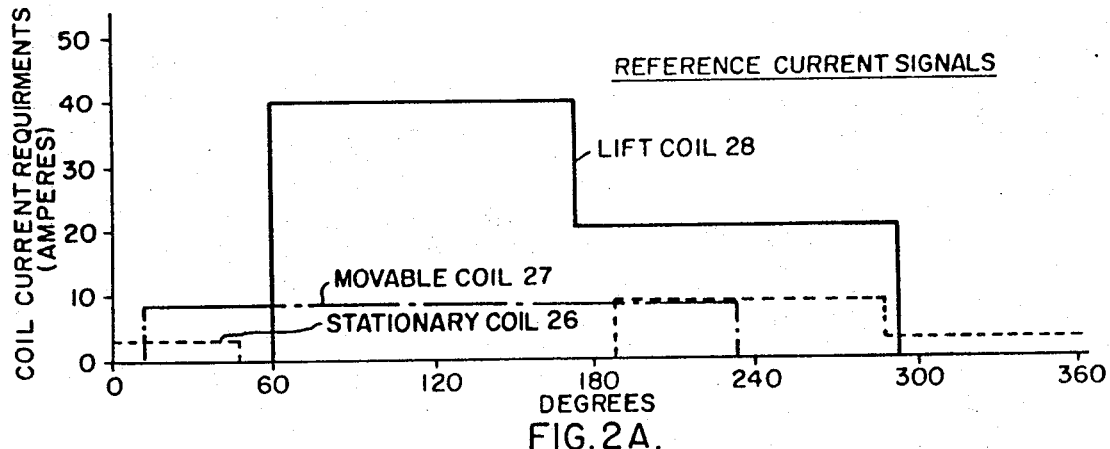
FIG. 2A and 2B shows the current requirements for a nuclear reactor rod control mechanism.
Figure 2B:
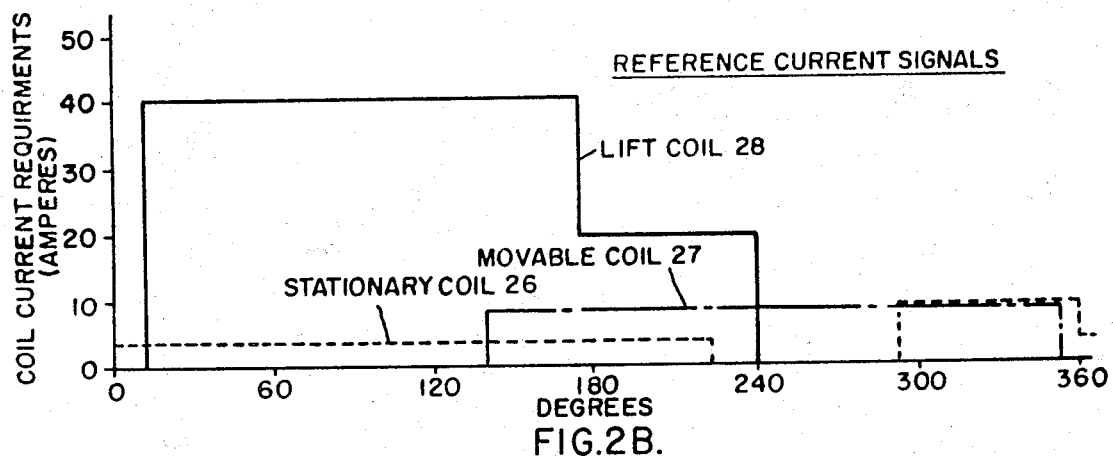

FIG. 2 shows the current requirements for each of the coils of a jack mechanism presently used in nuclear reactor rod control systems. More particularly, the reference signals provided by reference current source 24 (FIG. 1) are shown which are used in providing the proper current through the lift, movable and stationary coils. FIG. 2A illustrates the reference current required for withdrawing a control rod one increment and FIG. 2B illustrates the reference current signal for inserting the control rod.

In both FIGS. 2A and 2B, the abscissa is given in degrees. A 360°-cycle desirably corresponds to a time of approximately 780 milliseconds. The former is appropriate since in this particular embodiment, the sequencing occurrence is cyclically repeated for each incremental movement. The values given ordinant are according to the desired current through each of the coils. The current sequence for the stationary gripper coil is given as waveform 26, movable gripper coil as waveform 27 and lift coil as waveform 28.

Thus, in a nuclear reactor rod control system having a plurality of jack mechanisms, each having stationary, movable, and lift coils, the reference current source 24 in FIG. 1 would provide three separate reference current signals in accordance with FIG. 2A and 2B to each plurality of movable, stationary and lift coils, since all of the control rods within a group are inserted or withdrawn together.

Figure 3:
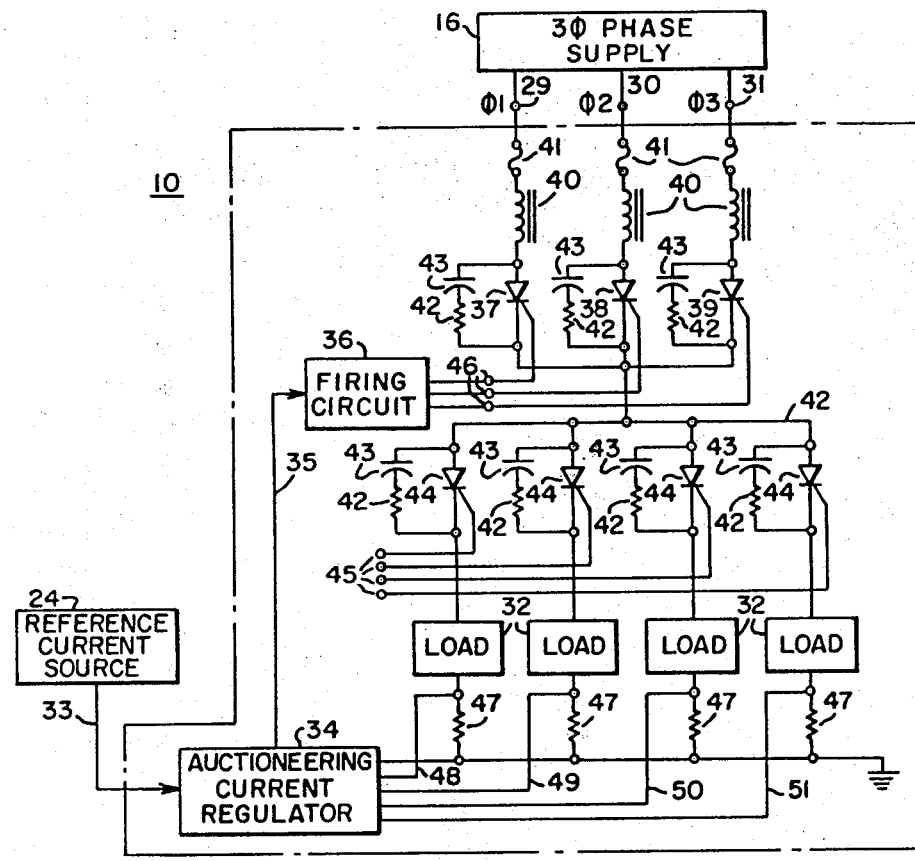
FIG. 3 is a schematic diagram illustrating in detail an improved power unit shown generally in FIG. 1.

FIG. 3 is a schematic diagram given for power unit and load elements 10 of FIG. 1. The arrangement shown therein would, for example, be desirable for energizing the lift coils in a jack mechanism. Three phase power source 16 provides a first phase output 29, a second phase output 30 and third phase output 31. Reference current source 24 provides the reference current signal according to the desired current to go through the plurality of load elements 32. The output 33 of reference current source 24 provides a signal to an improved auctioneering current regulator 34 which will be described in more detail hereinafter. The auctioneering current regulator 34 provides a signal 35 to a firing circuit 36.

Firing circuit 36, is of a type which is well known to those skilled in the art. It includes among other elements, a high frequency pulse generator for providing gate signals to sequentially fire each of the thyristors 37, 38 and 39. The phase angle to the line voltage at which the gating signals are provided is determined by the auctioneering current regulator 34. One such firing circuit is disclosed in U.S. application Ser. No. 686,407 by Gyugyi, Pelly and Rosa entitled "Pulse Producing System" filed Nov. 29, 1967 and assigned to the assignee of the present invention.

Signal 35 from the auctioneering current regulator controls the phase angle at which the firing circuit provides gate pulses to the gate inputs 46 of controlled switching devices or thyristors 37, 38 and 39 each of which has its anode connected to the three phase outputs 29, 30 and 31 respectively of the three-phase power supply 16 via inductive devices 40 and fuses 41 as shown. The cathodes of thyristors 37, 38 and 39 are connected to a common output terminal branch 42. By varying the phase angle at which the thyristors 37, 38 and 39 are energized an output voltage across the load elements 32 from full positive to full negative is possible. Note however, that a minimum positive direct current must flow through the load elements to maintain the thyristor, conducting successively. A resistor 42 and capacitor 43 are provided in parallel with thyristors 37, 38 and 39 for preventing rapidly changing voltages across the same to cause improper conduction thereof. Resistors 42 and capacitors 43 are also provided in parallel with thyristors 44. The plurality of load elements 32 are connected to the output terminal 42 of thyristors 37, 38, 39 through three thyristors 44. Each thyristor 44 has an input gate 45. Normally these thyristors are gated so as to act like ordinary diodes, and used to prevent circulating currents from flowing between the load elements 32 is the load elements have an inductive impedance such as the coils of a nuclear rod control jack mechanism. To isolate the load elements from the power source, thyristors 44 can be operated as an open switch. Such an arrangement is useful in a nuclear rod control system for deenergizing individual jack mechanism lift coils to realign control rods should they get out of alignment. Furthermore, an auxiliary DC power supply (not shown) can be connected to hold the control rods by providing current through them. This permits trouble-shooting of the equipment without requiring the shutdown of the plant.

Current monitoring resistors 47 are provided in series with each of the load elements 32. Connections 48, 49, 50 and 51 to the auctioneering current regulator permits the same to compare the largest voltage, indicative of the current through each load element, across any of the resistors 47 with the reference current signal provided by reference current source 24.

By using the largest value only for purposes of comparison several difficulties are averted. For example, if the average current is used in comparison with the reference current, and if one of the load elements were disconnected or open-circuited, it can be seen that to maintain the desired average current, the load currents must be increased in the remaining elements. Hence the use of the average current is not an acceptable solution, since it provides higher undesirable current increases.

A second alternative would be to monitor the load element having the lowest current value. Again, this would require that the auctioneering current regulator call for higher values through the remaining load elements. Thus, by selecting the leg having the highest current therethrough, no more than the desired current will flow in any of the remaining load elements. This is particularly important since the maximum current which can go through any of the load elements must be limited.

Figure 12:
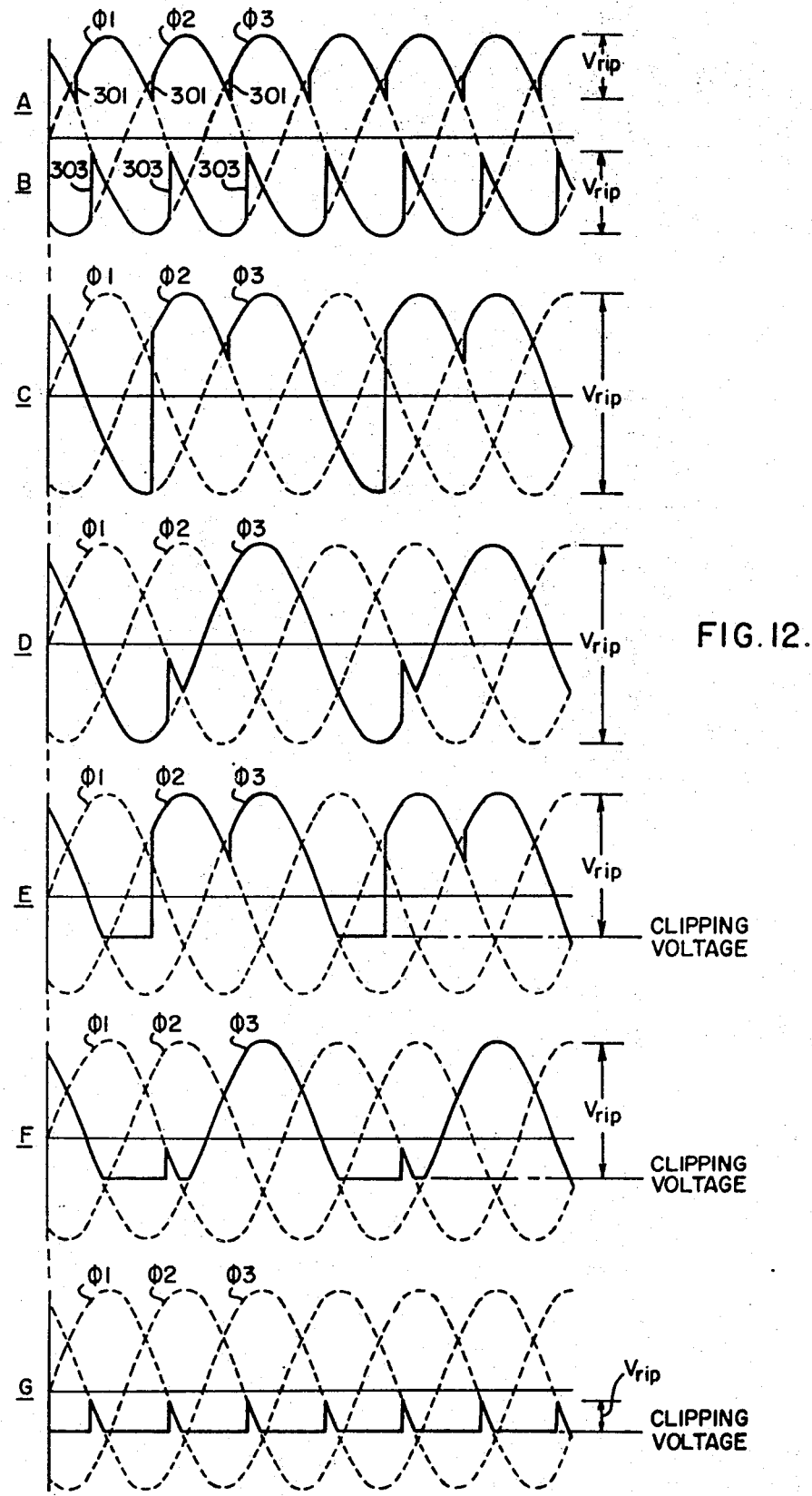
FIG. 12 is a series of curves illustrating various outputs from the improved power unit shown generally in FIG. 3.

For maximum positive forcing, thyristors 37, 38 and 39 are fired so that they behave as simple rectifiers. The output from the three phase power supply 16 may be seen more readily by reference to FIG. 12, which shows the three output phases, 120° apart. The heavily scored portion of the voltage waveform A of FIG. 12 corresponds to the waveform from the three-phase thyristor bridge applied to the load elements. Note that the waveform is positive and has a ripple component. According to the present invention the thyristors are naturally commutated. The value of the average voltage across the load can be lowered if the firing angles of the thyristors are retarded. In B of FIG. 12, illustrating the maximum possible negative voltage forcing, the firing times have been retarded to a point where the average voltage is negative. When this occurs, the current through the load will fall quickly to zero. The inductive energy in the coils during negative forcing is not dissipated, as occurs when mechanical contactors are opened, instead it is returned to the power source 16.

Segment 301 of the waveform in A of FIG. 12 corresponds to the commutation period during which one thyristor fires and another turns off. More particularly, when thyristor 37 is fired, phase 1 voltage is applied across the load. When the voltage of phase 1 drops below that of phase 2, i.e., phase 1 becomes negative with respect to phase 2, thyristor 38 is fired, and thyristor 37 cuts off thereby applying phase 2 voltage across the load. The same result occurs as the phase 3 voltage becomes greater than phase 2 voltage, phase 1 becomes greater than phase 3, and so forth.

Note in B of fig. 12, that ripple during maximum negative voltage forcing is greater than ripple during maximum positive forcing as shown in A of FIG. 12. This is due to the desirability of firing the next succeeding thyristor well before the maximum theoretical point at which commutation could occur, thus providing a safety margin for insuring proper commutation. As a result, however, the amount of ripple negative forcing is greater than it is for positive force.

It can be seen that the present invention can be utilized to effect the current waveforms shown in FIGS. 2A and 2B for a nuclear reactor rod control system by providing a separate power unit and reference current signal for each of the jack mechanism coils. For example, to provide the lift coil waveform as in FIG. 2A for one withdrawal cycle, full positive voltage forcing is applied initially through each lift coil. As the current approaches the 40-amp level, the thyristor firing angles are automatically retarded by the auctioneering current regulator and firing circuit to maintain 40 amps through the load elements. After approximately 180° into the cycle, holding current of approximately 20 amps is required. The firing angle of the thyristors is retarded to provide negative voltage forcing as shown in B of FIG. 12 and reactive power is returned to the power source. As the current reaches 20 amperes, the firing angle is automatically adjusted to maintain this value. At approximately 300° into the cycle, negative voltage forcing is again applied, reactive power is returned to the power source and the current falls to zero. Fig. 2B gives the reference current signals to insert the control rods.

Figure 4:
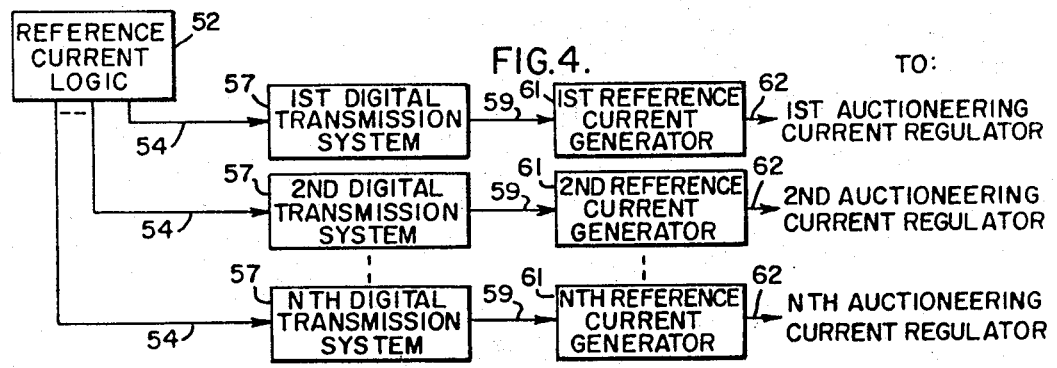
FIG. 4 is a block diagram of the novel reference current source shown in FIG. 1.

Details of the reference current source are shown in FIG. 4. Reference current logic circuitry 52 provides digital signals according to the desired current through each of N load elements or groups of load elements. In the case of a nuclear rod control system wherein the current pattern comprises a cyclical sequence the current reference logic means 52 may comprise a solid state slave cycler. Where N current patterns are required, for N elements or groups of load elements N sets of digital output signals from the reference current logic circuitry are provided. In a rod jack mechanism three such sets of signals 54 are required for the lift, stationary, and movable coils. For the movable coil waveform 27 which has only a single nonzero current value, the set of signals 54 consists of a single binary signal. For the lift coil waveform 28 which has two nonzero current levels the set of signals 54 requires two binary signals. Similarly, for the stationary coil waveform 26, the set of signals 54 requires two binary signals.

Since the present system may be used where high currents are present, high noise levels are likely to be present. Thus, a plurality of N sets of binary transmission systems 57 are provided for transmitting first, second and Nth sets of digital signals 54 from the current reference logic 52. Details of the binary transmission system will be discussed subsequently.

The digital outputs 59 from the binary transmission system 57 is sent to a plurality of N reference current generators 61. The output signals 62 from the current reference generators 61 are sent to the N auctioneering regulators. Each reference generator 61 is responsive to the digital input signals 59 to provide an analog output signal in accordance with the desired current to flow through the respective load elements or groups of load elements. Signal generators of this type are well known in the art.

Figure 5:
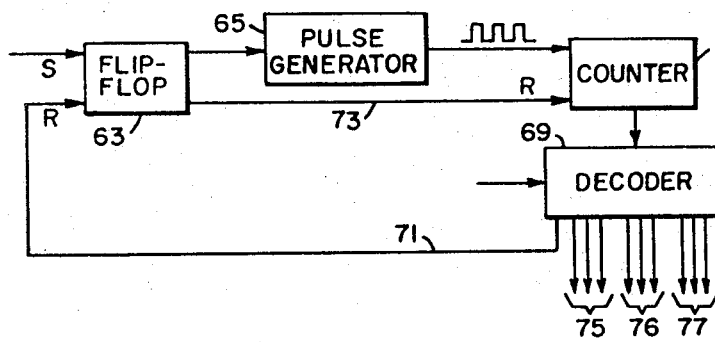
FIG. 5 is a block diagram of an improved reference current logic shown generally in FIG. 4.

FIG. 5 shows a block diagram of a slave cycler suitable for use as the current reference logic circuitry 52 in FIG. 4. It comprises conventional, well known elements. An input pulse S sets a flip-flop 63 which remains in the set state until the end of the cycle. When the flip-flop 63 is set, it causes pulse generator 65 to provide a train pulse of pulse signals to a counter 67. A decoder 69 provides a plurality of groups of output pulses from outputs 75, 76 and 77 at predetermined counter states. When the counter 67 reaches its maximum state, the decoder 69 provides a signal via line 71 to reset flip-flop 63.

In a rod control system, the improved solid state slave cycler of FIG. 5 may be the mechanical cam type cycler presently used. Desirably, in a rod control system, counter 67 which is a seven-bit binary counter is capable of 128 states. This is equivalent to quantizing a presently used cam cycler into 2.8° steps. Pulse generator 65 desirably provides a pulse signal every 6.1 milliseconds to counter 67. When the counter state reaches state 21, corresponding to about 59° of one cycle, the decoder 69 provides a pulse from one of the outputs 75 to, for example, first reference current generator 61 (FIG. 4) to provide lift coil current. When the counter reaches the state 59, corresponding to about 165° of the cycle, the decoder provides another pulse from another of the outputs 75 to the same reference current generator, to provide a reference signal calling for 20 amperes per coil. When the count reaches 103, corresponding to 288°, the decoder provides a final pulse through another of the outputs 75 to set the reference current signal to zero. Similar pulses are provided from outputs 76 and 77 in accordance with the required current for the stationary and movable coils in the jack mechanisms.

It should be understood that the aforesaid slave cycler should not be limited to providing pulse signals for only three current levels. Furthermore, more than three groups of outputs from the decoder 69 may be used where more than three current patterns are required. The decoder 69 may be broken down into three separate decoders rather than one decoder 69 as shown. That is, the number of decoders may correspond in number to the number of different current reference signals required.

Figure 6:
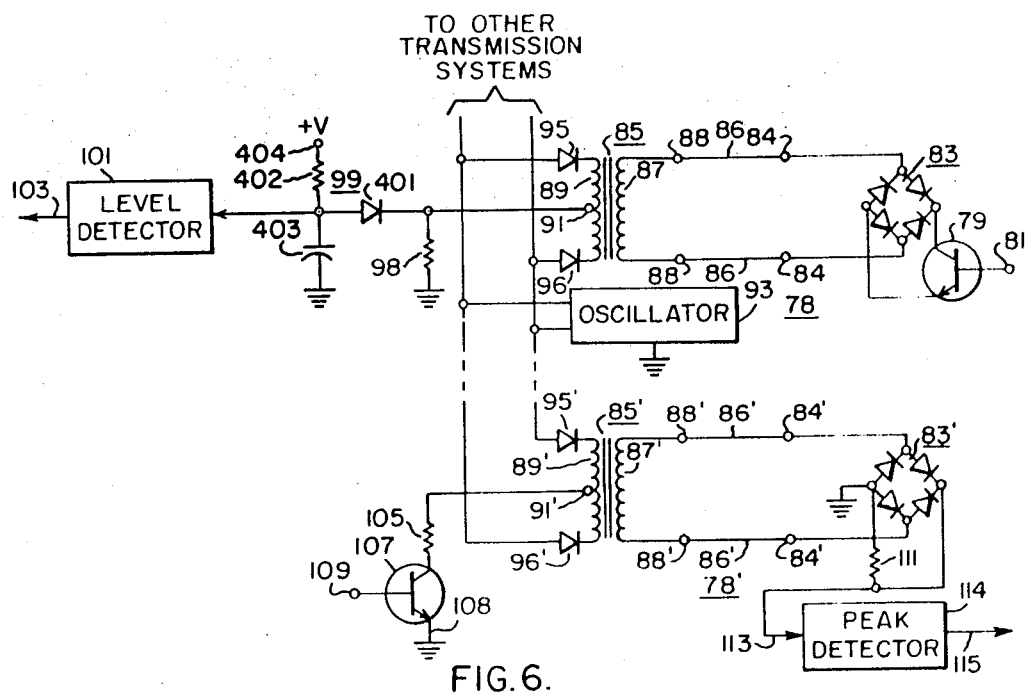
FIG. 6 is a schematic diagram of a novel digital transmission system.

Each digital transmission system 57 in FIG. 4 is comprised of a plurality of transmission circuits 78 shown in FIG. 6. For each binary signal to be transmitted one circuit 78 is required. Digital signals from, for example, current reference logic 52 (FIG. 4) are provided to transistor 79 through base input 81. The transistor is biased so as to operate in a switching mode. The transistor 79 and diode bridge 83 may be connected to a line 86 at terminals 84. The terminals from the secondary winding 87 are then connected at 88 to the line 86 forming a secondary circuit including transistor 79 and diode bridge 83.

An oscillator 93 is connected with the primary winding 89 through diodes 95 and 96. These diodes are arranged to provide a direct current signal through the center tap contact 91 and through resistor 98 to ground.

If switching transistor 79 is in a nonconducting state, thereby open-circuiting the secondary circuit, the amount of current through resistor 98 will be relatively small following each polarity reversal of oscillator voltage. However, if transistor switch 79 is conducting, a short-circuited condition exists across the secondary winding 87. This causes a large current flow through the primary winding 89 and through resistor 98. The level of current through resistor 98, is detected by minimum peak detector 99, comprising a diode 401, a capacitor 403 and a resistor 402 and connected to a positive voltage source 404 as shown. With switching transistor 79 in a nonconducting stage, the minimum positive value of voltage detected by detector 99 and stored across capacitor 403 has a small magnitude compared with the voltage stored across capacitor 403 when switching transistor 79 is in a conductive state. The signal from the detector 99 is then sent to level detector 101, which is also a well known device in the art, which provides a binary 0, from output 103 if the peak value of the current through the resistor 98 is low and provides a binary 1 signal if the value of the voltage across resistor 98 is large.

Thus, in summary, if a binary 1 signal is sent to the base input 81 of transistor y9, thereby causing the transistor 79 to conduct, the binary 1 signal will be detected and provided from output 103 of the level detector 101. Likewise, if a binary 0 input is provided at input 81, transistor 79 will remain nonconductive and the output from the level detector 101 will be a binary 0. It can be seen that the transformer 85 provides the necessary isolation in a system where high noise levels are present thereby aiding the transmission of digital signals. While any suitable high frequency oscillator 93 may be utilized, if firing circuit 36 (FIG. 3) includes a square wave generator for providing gate pulses to the rectifying thyristors, it may be utilized in the digital transmission system 78. It should be noted, however, that in the event of the failure of the square-wave generator therein, such oscillator would result in impossibility of transmitting digital information via the present transmission system to the auctioneering current regulator and hence the operation of the thyristor bridge in FIG. 3 would be impossible. However, this is not important, since the corresponding thyristors would no longer be fired, if the oscillator failed and hence current regulation would not be possible anyway.

Also shown in FIG. 6 is a second digital transmission system 78' utilizing the same oscillator 93 for transmitting digital signals from the primary winding 89' side to the secondary winding 87' side of isolation transformer 85'. The primary winding 89' has a center tap contact 91'. Input resistor 105 is connected between the center tap contact 91' and the collector of transistor switch 107'. The transistor switch 107' has an emitter 108 which is grounded and a base input 109. The signal from oscillator 93 flows alternately through diodes 95' and 96', which provide direct current through resistor 105 when transistor 107 is turned on. The secondary winding 87' of transformer 85' is connected at terminals 88' to line 86'. A diode rectifying bridge 83' is connected between terminals 84' and resistor 111.

When a binary ONE input is applied at the base terminal 109, switching transistor 107 becomes conducting, providing a current path from the oscillator 93 through the primary winding 89' and the center tap 91' to ground. This results in an induced secondary current in a secondary winding 87'. The current is rectified by the rectifier bridge 83' causing a direct current to flow through the resistor 111. A peak detector 114 of a type well known in the art, is coupled with resistor 111 through connection 113 to detect the presence of a voltage across the resistor 111 and provide an output signal at its output terminal 115, thus indicating the presence of the binary ONE at the input terminal 109.

If a binary ZERO is provided at input 109, switching transistor 107 will be nonconducting thereby open-circuiting the path from the center tap terminal 91 of primary 89' to ground. Thus no current will flow through the center tap terminal, and of course, no current will be induced in the secondary winding 87'. Thus, no current will flow through resistor 111, the peak detector will detect zero voltage across the resistor 111, and the output 115 of the peak detector will be zero and indicate the presence of a binary ZERO input at input contact 109.

Figure 7:
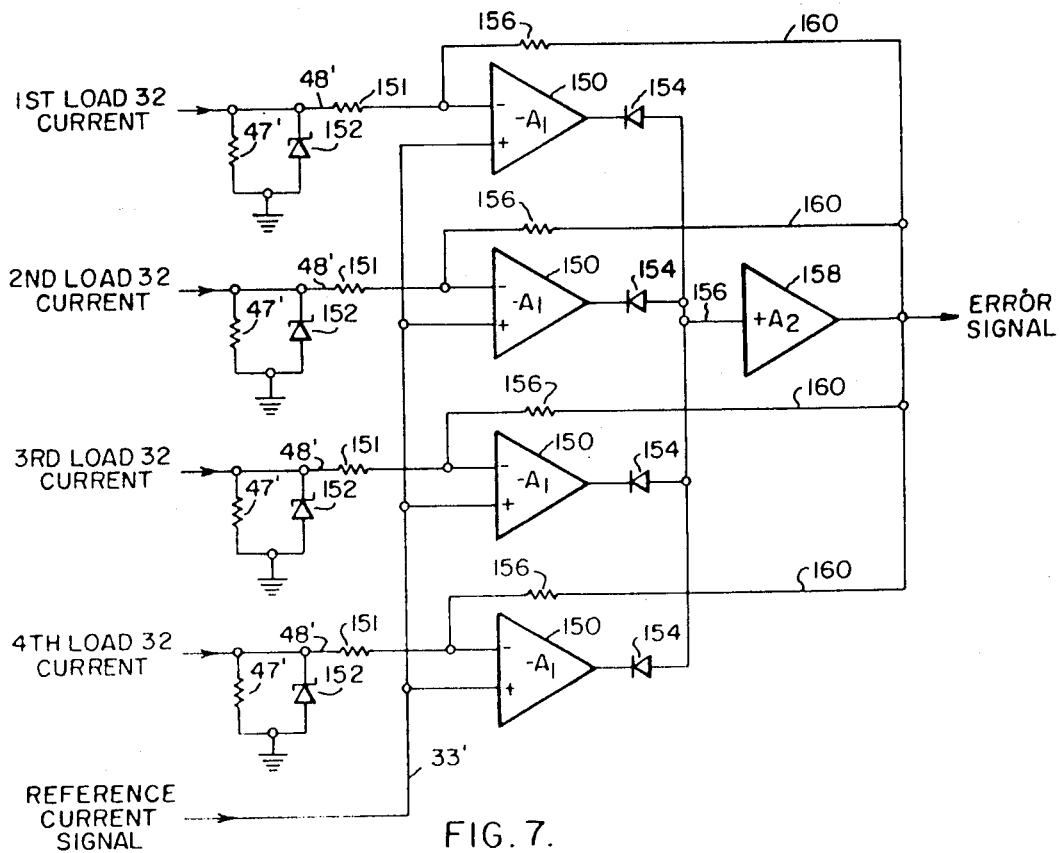
FIG. 7 is a schematic diagram of an improved current regulator shown generally in FIG. 3.

One embodiment of the auctioneering current regulator 34 shown in FIG. 3 is illustrated in FIG. 7. The current through each of the load elements 32 (FIG. 3) passes through monitoring resistors 47' to ground. The voltage across each of the resistors 47' is sent to a plurality of differential amplifiers 150 through line 48' which includes resistors 151. Zener diodes 152 are connected across resistor 47' to keep the voltage applied to amplifier 150 within predetermined levels. Also provided to each of the differential amplifiers 150 through line 33' is the reference current signals from the reference current source 24 (FIG. 3). The output from each differential amplifier 150 is sent through a diode 154 which is positioned as shown. The diodes 154 are connected to form a single line 156 which is sent to amplifier 158. The output from amplifier 158 is fed back to amplifiers 150 through loops 160 which includes feedback resistor 156.

Each of the differential amplifiers 150 provide negative amplification having an amplification factor A1. Because of the direction of diodes 154, the signal provided to amplifier 158 through 156 will be the most negative of the signals from amplifier 150. Since amplifiers 150 provide negative amplification, this means that the signal provided to amplifier 158 will correspond to load 32 having the largest current flowing therethrough. Amplifier 158 has positive amplification A2 and merely amplifies the signal at 156 to provide the error signal output. The feedback loops 160 provide signal stability.

Figure 8:
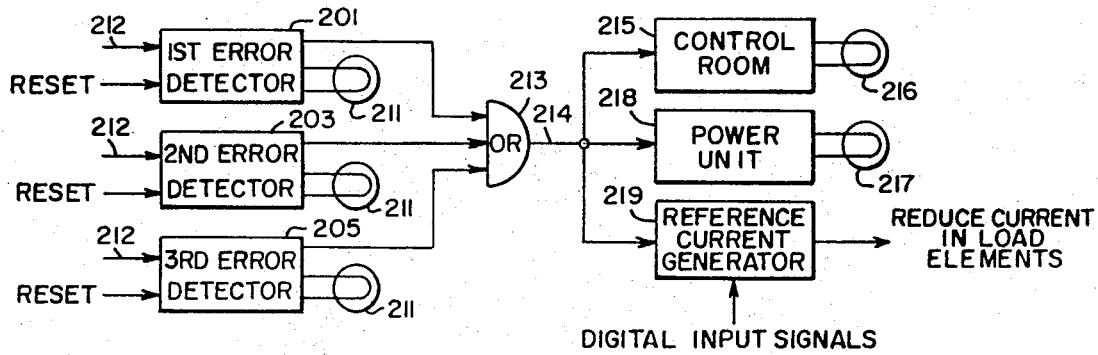
FIG. 8 is a block diagram illustrating an improved alarm providing system.

FIG. 8 is a block diagram of an error detection system for the current regulation system described above. Three error detector circuits 201, 203 and 205 are provided for each of the power units. Each has an input 212 to receive strategic signals from within the system and a second input signal to reset each error detector once the fault is corrected. Each error detector is also provided with an alarm indicating lamp 211. Whenever an error is detected by any of the error detectors the lamp 211 for that particular error detector is energized.

Signals from the error detectors are gated through OR gate 213. An alarm signal 214 is thus sent out from the OR gate 213 if any of the error detectors provides an alarm signal. The alarm signal 214 is sent to the control room 215 if, as in the case of a nuclear reactor power plant, the control room is physically separated from the power supply units. A control room alarm lamp 216 is energized when an alarm signal is received to warn the control operator of a fault in the system.

In a system a large number of load elements and groups of load elements, a fairly substantial number of power units may be required. Thus, it is necessary to provide means for identifying the faulty power unit which, because of its solid state design, may not be readily observed to be faulty. Thus, each power unit 218 is provided with an alarm lamp 217, mounted upon its housing, which is energized by the alarm signal 214 from gate 213 so that an operator may identify quickly the faulty power unit. By then inspecting each of the error detectors the operator is then able to determine the exact location of the fault because of the alarm lights 211 associated with each of the error detection circuits.

Finally, the alarm signal from the gate is also sent to the reference current generator 61 described in conjunction with FIG. 4. The current reference generator is provided with a logic circuit for first disabling the normal digital input signals from the current reference logic 52 is secondly, in the case for example, of a nuclear reactor control rod or jack mechanism, wherein it is desirable to prevent rod droppings, for providing a signal to each of the firing circuits 36 (FIG. 3) to reduce the current through the stationary and the movable coils and to stop current through the lift coils.

In a rod control system, when the operator locates the fault and makes the appropriate repairs the reset cycle is then instigated by manually providing a reset signal to the appropriate error detector. Maximum current through the stationary coil is then called for and if maximum current flows the error detector is reset. If full current does not flow through the stationary coil, that is, if the stationary grippers are not engaged properly, the error detector will not be reset even if a reset input is provided. This is true regardless of how many times the reset signal is given. Thus, a second condition necessary to reset the error detectors is the connection of the fault. If the fault persists the error detector will not be reset even if a reset input is provided. During this period the reduced holding current through the stationary and movable coils remains and will not be increased until the fault is corrected and the error detector is reset.

Figure 9:
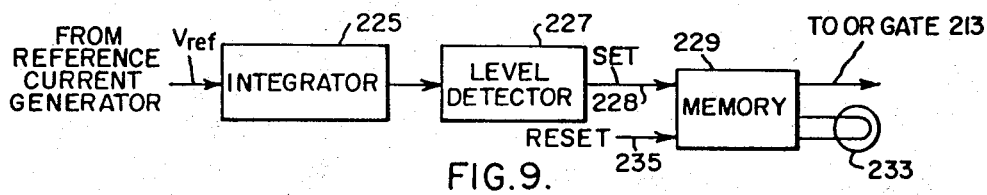
FIG. 9 is a block diagram of one improved error detector illustrated generally in FIG. 8.

FIG. 9 shows a circuit to protect against full current applied to the load for a period of time longer than that desired, which may reset for example, because of a malfunction of the current reference logic, the current reference generator, or other faulty conditions. The output signal $V_{ref}$ from each of the current reference generators 61 (FIG. 4) in addition to being sent to an auctioneering current regulator is also sent to an integrator or timer 225. A level detector 227 senses when the integrator has reached a predetermined level which is determined by the normal length of time for which full current is required. At this time, the level detector provides a signal to input 228 of a memory unit 229 to set the memory. The memory unit when set, sends an alarm signal to OR gate 213 in FIG. 8. It also energizes an alarm indicating lamp 233 which indicates that a fault is present. The memory unit 229 is provided with input 235 for resetting the memory. When reset, alarm indicating light 233 will turn off. However, it will not reset the memory unit until the fault is corrected because the signal from the level detector will override the reset signal if the fault has not corrected. The level detector 227 and integrator 225 may be any suitable device, well known in the art, for performing the aforesaid functions. Memory 229 desirably is a set predominant flip-flop wherein any reset signal is overriden by the presence of a set signal. Such devices are also well known in the art.

The second error detector circuit encompassed by the present invention is a regulation error detector which monitors the actual current going through each of the plurality of load elements. In most applications, it is very important that the actual current through the load elements be what is called for. For example, in rod control systems, if the proper current is not applied to the jack mechanism coils, control rods may be dropped or rod sequencing will be disturbed. The consequences of these two events is disadvantageous as discussed previously.

Figure 10:
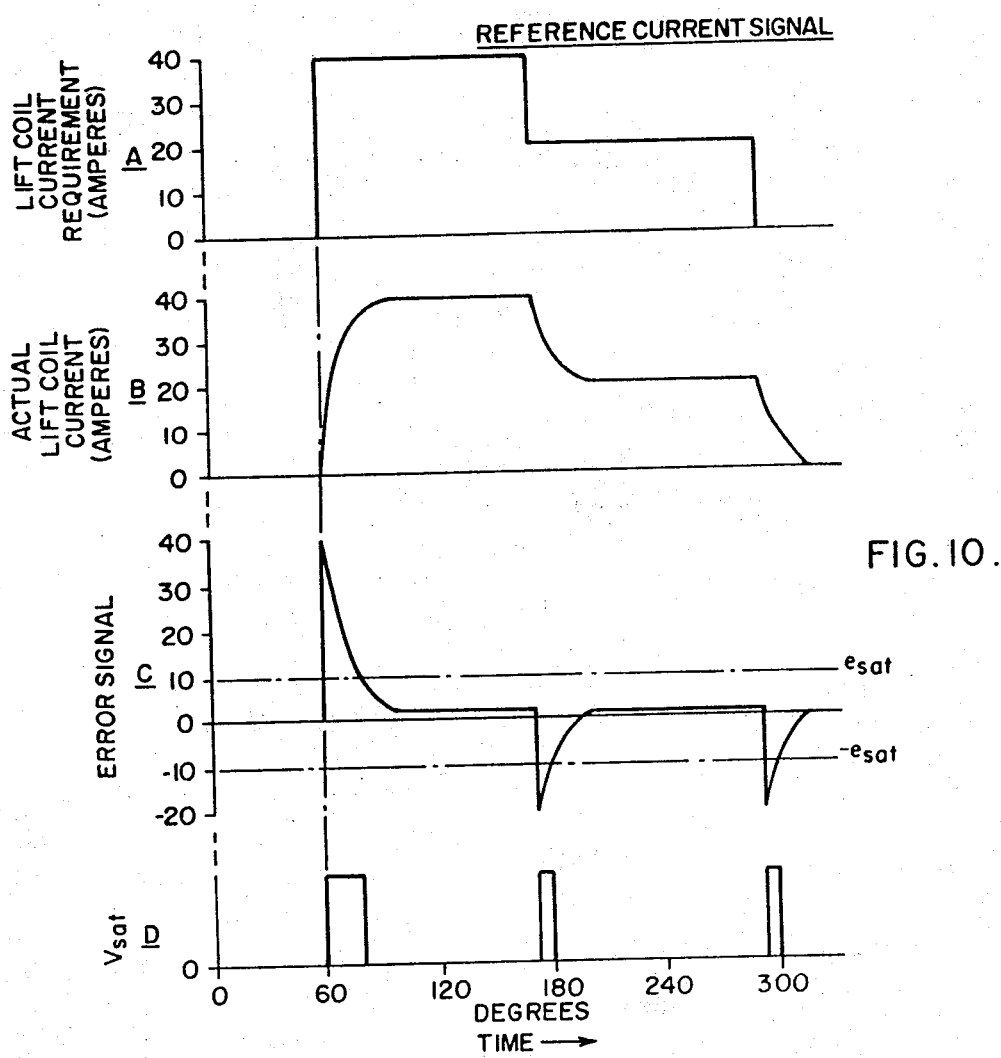
FIG. 10 is a series of curves illustrating signals provided with respect to the improved error detector of FIG. 11.

A of FIG. 10 shows the reference current signal required in a lift coil of a jack mechanism to withdraw a rod one step or increment as discussed previously.

B of FIG. 10 shows the actual current through the lift coil for the reference signal in A of FIG. 10. Due to the inductance of the lift coil, the actual current through the coil is not a sharp rectangular wave like the reference current signal. The difference between the actual current through the coil and the reference current, herein referred to as the error signal, is shown in C of FIG. 10. Note that when the reference current goes from 0 to maximum current, a large error signal results, but as time passes and as the actual current through the lift coil approaches that which is called for, the error signal decreases. At 180° and 300° into the cycle, note that the error signal has a negative value. This is a result of negative forcing at those times when the reference current value decreases.

Figure 11:
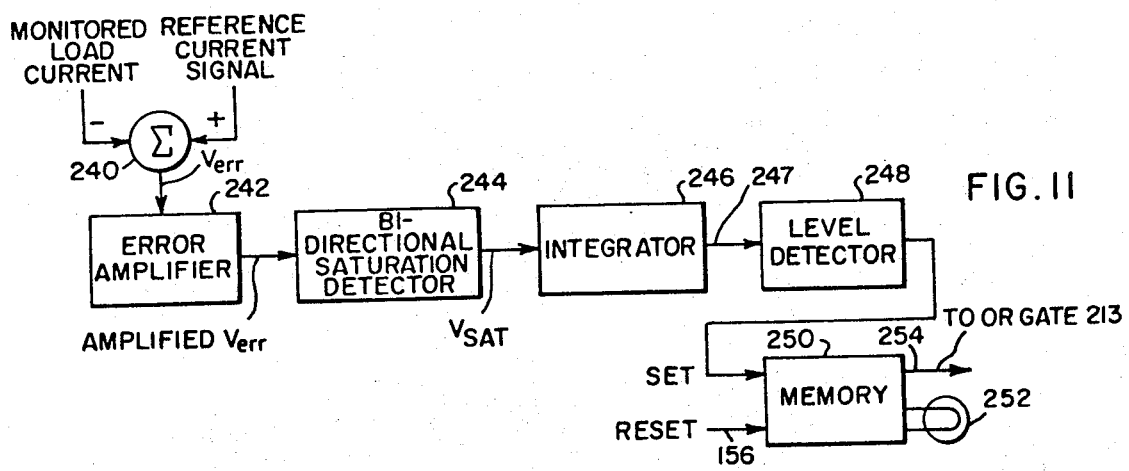
FIG. 11 is a block diagram of a second improved error detector illustrated generally in FIG. 8.

A block diagram of the second error detector is shown in FIG. 11. The actual current through the load element, here a lift coil, and the reference current signal are summed at 240 to provide an error signal. The error signal $V_{err}$ is inputted into error amplifier 242, which saturates above a predetermined absolute value error signal input. This is indicated at $e_{sat}$ in C of FIG. 10. Referring to B of FIG. 10, it can be seen that the error amplifier will always go into saturation whenever there is a change in the reference current signal. However, if the amplifier stays in the saturated state longer than a predetermined time period, determined by the time constant of the load, then it may be concluded that the desired current through the load elements have not been reached.

In accordance with the foregoing conclusion, the amplified error signal from error amplifier 242 is sent to a bidirectional saturation detector 244. Saturation detector 244 provides a constant valued signal $V_{sat}$ so long as the amplifier error signal corresponds to the saturated value, regardless of the polarity of the error signal. D of FIG. 10 shows the output $V_{sat}$ of saturation detector 244 for the error signal shown in C of FIG. 10, corresponding to the saturation during normal operation.

The output, $V_{sat}$ of saturation detector 244 is then sent to an integrator or timer 246. So long as the pulses from the saturation detector are short in duration, reflecting the normal period of time in which the error amplifier 242 is saturated, the output signal 247 from integrator 246 remains below the threshold of level detector 248. However, should the error amplifier 242 remain saturated for a period of time longer than normal, the output signal 247 of integrator 246 exceeds a predetermined value. This is sensed by level detector 248 which provides a set signal to memory 250. When set the memory provides two output signals, the first to energize a lamp 252 in proximity with the housing containing the faulty power unit and a second 254 to OR gate 213 (FIG. 8). The memory may be reset at input 256. As in the first error detector described previously, memory 250 can only be reset if the fault has been corrected and if the stationary grippers are properly engaged.

The summing element 240, error amplifier 242, detector 244, and level detector 248 are all well known in the art and any such suitable devices may be used. Memory 250, desirably is a set predominant flip-flop, a well known device described earlier in conjunction with the first error detector.

In a control rod system, a power unit according to the present invention can still hold the rods without dropping them, even if one phase of the three-phase power supply is lost. For example, if a fuse in one phase line blows out, control rods will remain held in position and the control system will continue to operate, even though its efficiency will be reduced because of increased ripple and distortion. However difficulties are encountered when the rods are inserted or withdrawn in two phases are operable. More time is required for the jack mechanisms to move each rod if one phase is missing since the power units are unable to provide maximum voltage forcing.

This can result in damage to the jack mechanisms as follows. If, for example, 10 milliseconds are normally required to deenergize the stationary coils with three phases operating and, as a result of the inability to provide maximum negative forcing with one phase missing, a reduction in current through the stationary coils takes, for example, 150 milliseconds before deenergization, then the lift coils will be activated and will start to lift the rods before the stationary grippers have fully released their grips. This wears the control rods and damages the jack mechanisms. Unless some type of protection is provided, a missing phase would probably not become known to the operator of the nuclear plant until perhaps several thousand steps later when the jack mechanisms become inoperable and the control rods are dropped. Thus it is the purpose of the third error detector to provide an alarm signal when a loss of one of the three phases occurs.

The three-phase output waveforms from the power supply are shown variously in FIG. 12. The heavily scored portion of the waveform corresponds to the waveforms from the thyristor bridge applied to the load elements. Maximum positive voltage forcing is shown in A of FIG. 12. The ripple voltage as noted earlier, corresponds to the voltage between the maximum and the minimum value of the commutated waveform and is indicated as $V_{rip}$. It can be seen that the average DC value of the commutated waveform will fall somewhere between the maximum and the minimum ripple voltages.

Maximum negative forcing is represented by the heavily scored portion of the curve in B of FIG. 12. The ripple voltage is larger than the ripple voltage during maximum positive forcing due to commutation time and safety margin considerations as noted earlier, resulting in that portion of the waveform 303 which increases the percentage of ripple.

C of FIG. 12 shows the output of the solid state bridge with phase 1 voltage missing during maximum positive forcing. It can be seen that there is still an average positive DC voltage even with phase 1 missing. This permits the operation of a jack mechanism coil, although it may decrease the operational times of each coil as noted. However, the ripple voltage is considerably larger than for the ripple voltage shown in A of FIG. 12 during normal three-phase positive forcing. In the particular waveforms shown the ratio of the ripple voltage for maximum forcing with phase 1 missing compared with the ripple voltage with three phases operating normally is roughly 4:1.

Referring to D of FIG. 12, here the waveform is shown during negative forcing with the thyristor in phase three operating as a diode. Again, the ripple voltage is considerably larger than the ripple voltage in B of FIG. 12, with all three phases operating properly. Note, however, that the ratio of the ripple voltage with the thyristor in phase 3 operating as a diode to the ripple voltage with all three phases operating properly is only around 2:1. This is due to the larger normal ripple voltage during negative forcing.

According to the present invention, means are provided to compare the actual ripple with the expected ripple during normal maximum positive and negative forcing and to provide an alarm signal whenever the actual ripple is greater than the normal ripple.

Figure 13A:
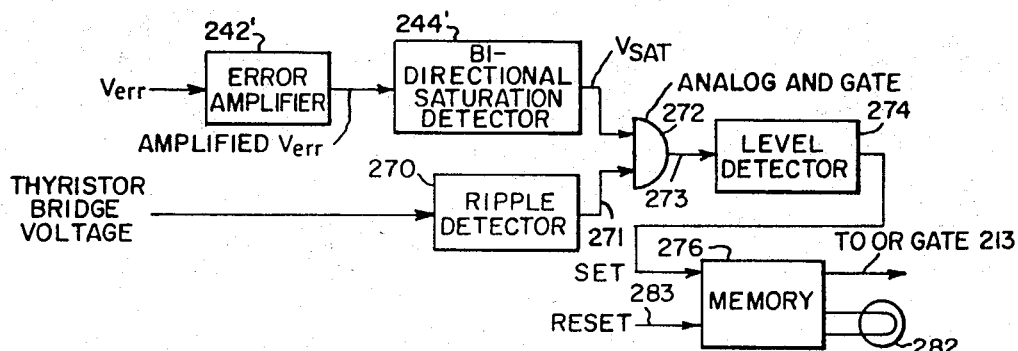
FIG. 13 is a block diagram of a third improved error detector illustrated generally in FIG. 8.

A block diagram of the missing phase detector is shown in FIG. 13A. The voltage from the thyristor rectifying bridge is monitored by a ripple detector 270, a well known device in the art. It provides a DC output signal 271 proportional to the amplitude of the ripple voltage through analog AND gate 272 to level detector 274 also a well known device.

The gate 272 is provided to make the missing phase detector operable only during periods of maximum positive and negative forcing, since it is only during maximum positive and negative forcing that "normal" ripple is present since ripple, being a function of the extent of the voltage forcing, varies accordingly. Therefore, it is necessary to provide an enabling gate signal to gate 272 during periods of maximum positive or negative forcing. This is accomplished by utilizing the saturation voltage $V_{sat}$ from the regulation error detector described above in conjunction with FIGS. 10 and 11, since $V_{sat}$ is provided only during maximum positive and negative forcing.

Thus the error signal $V_{err}$ from the summing element 240 (not shown) is sent to error amplifier 242'. The error signal is then amplified and sent to bidirectional saturation detector 244', which provides an output $V_{sat}$, whenever error amplifier 242' saturates. $V_{sat}$ is used to gate the signal from ripple detector 270 so that the signal 273 from gate 272 is provided during maximum positive or negative voltage forcing. Thus, whenever the ripple value during positive and negative forcing, exceeds the normal ripple voltage level, a signal is provided from level detector 274 to set a memory 276. When set, memory 276 provides an alarm signal from a first output 278 and also a signal to energize an alarm indicating lamp 282. Lamp 282 is located on or in proximity with the cabinet housing the power unit in which the fault has occurred. The alarm signal from output 278 is sent to OR gage 213 (FIG. 8). The memory 276 is also provided with a reset input 283 for resetting the memory once the fault has been corrected and the stationary grippers are properly engaged.

As noted previously, in the case of maximum positive voltage forcing the ripple voltage with a phase missing compared with the normal ripple voltage is approximately 4:1; but that in the case of maximum negative voltage forcing the ratio of the fault ripple voltage with normal ripple voltage is approximately 2:1. The output from the three-phase power source is, as a practical matter, likely to vary. Also ripple detector 270 and level detector 274 might be expected to drift over a period of time. Thus a ratio of 2:1 fault to normal ripple may not be sufficiently large for accurate determinations. The problem does not arise in the positive forcing voltage situation because of the inherently greater ratio between the normal ripple and the fault ripple.

To overcome this difficulty negative clipping is provided to reduce the effective ripple of the monitored load current signal during normal maximum negative forcing. Referring to E of FIG. 12, the output from the thyristor rectifying bridge circuit is shown with one phase missing during positive forcing negative clipping as shown. The benefit of negative clipping will become apparent with reference to F and G of FIG. 12.

In G of FIG. 12 the normal three-phase negative forcing is shown with all phases operating and with negative clipping. It can be seen that the ripple voltage is considerably less than without negative clipping as in B of FIG. 12. Negative clipping does reduce, to some extent, the magnitude of the ripple voltage with phase thyristor operating for example, as a diode. This can be seen by reference to F of FIG. 12. Thus the ripple ratio during normal three-phase operation with negative clipping will be increased from 2:1 without clipping, to 3:1. This improves the reliability of the detector since an increased ripple ratio means that more leeway is provided for system drift.

The normal positive forcing ripple voltage will remain the same since it is entirely within the positive region. The affect on the ratio between the normal ripple to the fault ripple with negative clipping will be reduced to around 3:1 for positive forcing. However, this provides a large enough ripple ratio so that drift within the system will not affect the ability of the missing phase detector to operate correctly. Thus the use of negative clipping has little or no affect on the operating of the missing phase detector during positive forcing.

Figure 13B:
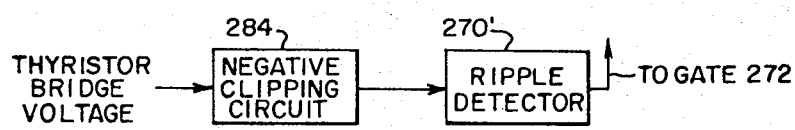

The use of the negative clipping circuit to improve the reliability and accuracy of the missing phase detector is illustrated in block diagram in FIG. 13B. Negative clipping circuit 284 is connected to the ripple detector 270'; otherwise the ripple detector circuitry of FIG. 13B is identical with the ripple detector circuitry of FIG. 13A. Thus the bridge monitored voltage which is a replica of the actual bridge voltage is first clipped so that it may never go below a predetermined value. Then this waveform is sent to the ripple detector 270' and then to the level detector 274 through gate 272.

One requirement of a nuclear reactor rod control system is that redundant power supplies be provided. Present rod control designs incorporate separate direct current power supplies. This results in duplication of expensive and bulky rectification apparatus. Another requirement is that there must be included within the system means for maintaining the output voltage within 10 percent of its value for one second when the input power is disconnected. Present systems are bulky station batteries for this purpose.

The present invention utilizes a single set of rectification means, as previously described. Redundancy is provided by using two sets of three-phase synchronous motor-generators which are synchronized, in an improved and novel way, to produce a single, three-phase output. Furthermore, synchronization is carried out without the use of current limiting inductances. The bulky station batteries are replaced with flywheels for maintaining the output voltage within 10 percent of its value when the input power is disconnected.

Figure 14:
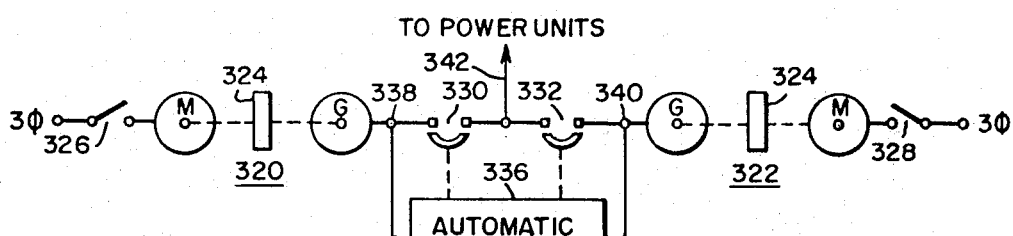
FIG. 14 is a block diagram of a novel system for providing three-phase power from two asynchronous motor generator sets.

In FIG. 14, two, three-phase synchronous motor-generator sets, 320 and 322 are shown, including flywheels 324. Three-phase power is supplied through switch or circuit breakers 326 and 328 to motor-generator sets 320 and 322, respectively. The outputs of the motor-generator sets 320 and 322 are sent through circuit breakers 330 and 332, respectively, which are connected together at terminal 342. An automatic synchronizer 336 is used to operate the circuit breakers 330 and 332 in a novel manner. The automatic synchronizer 336 is electrically connected at the outputs of motor-generators 320 and 322 as indicated.

The function of the automatic synchronizer 336 is to accurately signal in advance circuit breakers 330 and 332 to close the desired one precisely when the phases to be synchronized are in phase, given the difference in frequency between the phases and the time required to close the circuit breakers 330 or 332. One automatic synchronizer for performing the above is disclosed in the above-mentioned U.S. Pat. application, Ser. No. 695,684, by Bednarek, et al., entitled "Automatic Generator Synchronizing and Connecting System and Synchronizer Apparatus For Use Therein."

Synchronization desirably is provided as follows. First, all breakers 326, 328, 330 and 332 are open. Second, breaker 326 is closed to energize motor-generator set 320. Third, breaker 330 is closed to energize the load. Fourth, breaker 328 is closed, energizing motor-generator set 322. Fifth, once the motor-generator set is up to speed, breaker 328 is opened. Sixth, the automatic synchronizer closes breaker 332; each of the phases being in phase and having equal voltages. Finally, breaker 328 is closed, thereby providing synchronized three-phase current through line 342.

Since the aforesaid power system provides direct current voltage therefrom, it is desirable to use the well-known zigzag configuration in the generator 322 windings to prevent saturation thereof.

We claim as our invention:

1. A regulation system for providing current according to a predetermined current level sequence from a multiple-phase power source one or more load elements comprising:
    rectifying means for connection between the multiple-phase power supply and the load elements, said rectifying means comprising a plurality of controlled switching devices each having a control gate, each of the inputs to said control switches being adapted for connection to a different phase of said power supply and each of the outputs from said control switches being connected to a common terminal which is adapted for connection to each load to provide rectified current to operate said load elements;
    means for providing a reference signal proportional to the desired current to flow through each of said load elements;
    means for providing gating signals to each of said control gates to sequentially energize the controlled switching devices;
    said reference signal means being connected to said gating signal means, and controlling the latter to control the phase firing time of each of said controlled switching devices to produce a load current to operate said load elements which is proportional to said reference signal.

2. Apparatus as in claim 1, including means for monitoring the actual current to each of the load elements;
    means for monitoring the current to the load element having the highest value of current flowing thereto; and
    means for comparing the value of the reference signal with the value of the current to the load element having the highest current flowing thereto and providing an error signal proportional to the difference between the two to the gate signaling means to alter the phase firing time of said plurality of controlled switching devices according to magnitude of the error signal to minimize said error signal.

3. A power supply and regulation system as in claim 1 wherein the reference signal means comprises:
    logic means for providing digital command signals according to the predetermined current level sequence;
    transmission means for receiving and relaying said digital command signals;
    generating means responsive to said digital command signals from said transmission means for providing an analog reference signal according to the predetermined sequence desired to the load elements.

4. A system as in claim 3 wherein the logic means comprises:
    a pulse operated bistable circuit;
    generating means for providing a train of pulse signals whenever said bistable circuit is set;
    counter means responsive to said pulse train to provide an accumulated pulse output;
    decoding means responsive to predetermined counter bit combinations to provide said digital command signals; said decoding means including means for providing a reset signal to said bistable circuit whenever a predetermined maximum number of pulses are accumulated in said counter means.

5. Apparatus as in claim 3 wherein said transmission means comprises:
    a transformer having primary and secondary windings;
    a secondary winding circuit comprising a switching circuit including a gate control input for shorting the secondary winding in response to a first binary input signal thereby causing a large current to flow through the primary winding, and for opening in secondary circuit in response to a second binary input signal thereby causing a small current to flow through the primary winding; a primary winding circuit comprising:
    a high frequency signal source for providing current through the primary winding; and
    means for sensing the value of the current through the primary winding and providing a first binary output signal corresponding to the first binary input signal when the current value through the primary winding is high and providing a second binary output signal corresponding to the second binary input signal when the current through the primary winding is low.

6. A system as in claim 5 having a center tapped primary winding and wherein the current value sensing means comprises:
    resistive impedance connected to ground to complete a current path to the high-frequency signal source;
    rectifying means for providing unidirectional current flow from the center tap of the primary winding through the resistive impedance;

a peak detector having an input associated with the resistive impedance and an output to provide a demodulated signal;
a lever detector to receive the demodulated signal and to provide an output signal whenever the demodulated signal is above a predetermined value.

7. A system as in claim 6 wherein the rectifying means comprises two diodes, one being connected between one of the terminals of the high-frequency signal source and one of the terminal of the primary winding in a direction to permit flow of current through the resistive impedance to ground during one-half of each cycle, and the second diode being connected between the other terminal of the high-frequency signal source and the other terminal of the primary winding in a direction to permit flow of current through the resistive impedance to ground during the other half of each cycle.

8. A system as in claim 5 wherein the switching circuit comprises a diode rectifier bridge and a three-layer semiconductor switching device connected to the output loop of the diode bridge.

9. Apparatus as in claim 3, wherein said transmission means comprises:
a transformer having primary and secondary windings;
a primary winding circuit comprising
a high-frequency signal source for providing current through the primary winding;
switching means to open the primary winding circuit in response to a first binary input signal and to close the primary winding circuit in response to a second binary input signal; a secondary winding circuit comprising means for providing a signal proportional to the absolute value of the current flowing through the secondary circuit; and
means responsive to the absolute value of the current through the secondary winding to provide a first binary output signal corresponding to the first binary input signal whenever the absolute value of the current is substantially small and to provide a second binary output signal corresponding to the second binary input signal whenever the average absolute value of the current is high.

10. A system as in claim 9 wherein the absolute current responsive means comprises:
a resistive impedance;
rectifying means coupled with the secondary winding to provide a pulsating unidirectional current through the resistive impedance;
a peak detector coupled with the resistive impedance to provide a demodulated output signal.

11. A system as in claim 10 wherein the rectifying means comprises a diode bridge.

12. A system as in claim 9 wherein the primary winding includes a center tap terminal and wherein the switching means comprises:
a resistive impedance with one terminal connected to the center tap terminal;
rectifying means to provide direct current through the resistive impedance;
switching device connected between the other terminal of the resistive impedance and ground to complete a current path to the high-frequency signal source.

13. Apparatus as in claim 1 including, a protection system comprising, first means for providing an alarm signal if the reference current signals exceed a predetermined value for longer than a predetermined time period.

14. Apparatus as in claim 13 wherein said first means comprises:
integration means responsive to the reference current signals;
level detection means responsive to the integrated reference current signals and for providing a first signal whenever the integrated reference current signal exceeds a predetermined value;
means responsive to the first signal for providing an alarm signal.

15. Apparatus as in claim 14 including means for inhibiting the alarm signal whenever the first signal ceases.

16. Apparatus as in claim 1 including, a protection system to provide an alarm signal whenever the actual load current exceeds the desired load current for a predetermined period of time, comprising:
first means responsive to the reference current signal and the actual current to the load to provide a current error signal;
second means responsive to said current error signal to provide a first signal whenever the absolute value of the current error signal exceeds a predetermined value;
third means responsive to said first signal for providing an alarm signal whenever said first signal is present for more than a predetermined time period.

17. Apparatus as in claim 16 wherein said third means comprises:
means for integrating said first signal;
level detecting means responsive to the integrated first signal to provide a second signal whenever the integrated first signal exceeds a predetermined threshold value;
means responsive to the second signal for providing an alarm signal.

18. Apparatus as in claim 16 including means for inhibiting the alarm signal whenever the first signal ceases.

19. Apparatus as in claim 16 wherein said second means comprises:
means for amplifying the current error signal wherein the amplifying means becomes saturated and provides a clipped error output signal whenever the magnitude of the current error signal exceeds predetermined positive and negative values;
means responsive to said amplified error signal to provide a unidirectional output signal whenever said error amplifier is saturated.

20. Apparatus as in claim 1 wherein the magnitude of the direct current being applied to the load element is a function of the phase angle at which each phase output is connected, the range of phase angles extending from that which provides maximum positive voltage forcing to that which provides maximum negative voltage forcing, and having a voltage waveform characterized as having a relatively small ripple component during maximum positive voltage forcing when all three-phase outputs are operable; as having a larger ripple component during maximum negative voltage forcing when all three-phase outputs are operable; and as having relatively large ripple components at other phase angles or whenever any of the phase outputs are inoperable, including a protection system for providing an alarm signal whenever the output from one of the phase outputs becomes inoperable during maximum positive or negative voltage forcing, comprising:
ripple voltage detecting means responsive to the load voltage to provide a first signal proportional to the magnitude of the load ripple voltage;
enabling means for relaying the first signal whenever maximum positive or negative forcing is called for;
level detection means responsive to the first signal during maximum positive and negative forcing to provide a second signal whenever the value of the first signal exceeds a predetermined threshold value indicating an inoperable phase;
means responsive to the second signal to provide an alarm signal whenever the second signal is provided.

21. Apparatus as in claim 20 including means for inhibiting the alarm signal whenever the inoperable phase becomes operable.

22. Apparatus as in claim 20 including means for reducing the ripple voltage during negative voltage forcing when all phases are operable whereby the predetermined threshold value required to provide the second signal may be lowered, comprising a negative clipping circuit for clipping the monitored load voltage below a predetermined negative voltage value.

* * * * *